W. H. LEE.
HARROW TOOTH.
APPLICATION FILED SEPT. 7, 1918.
1,308,635.
Patented July 1, 1919.
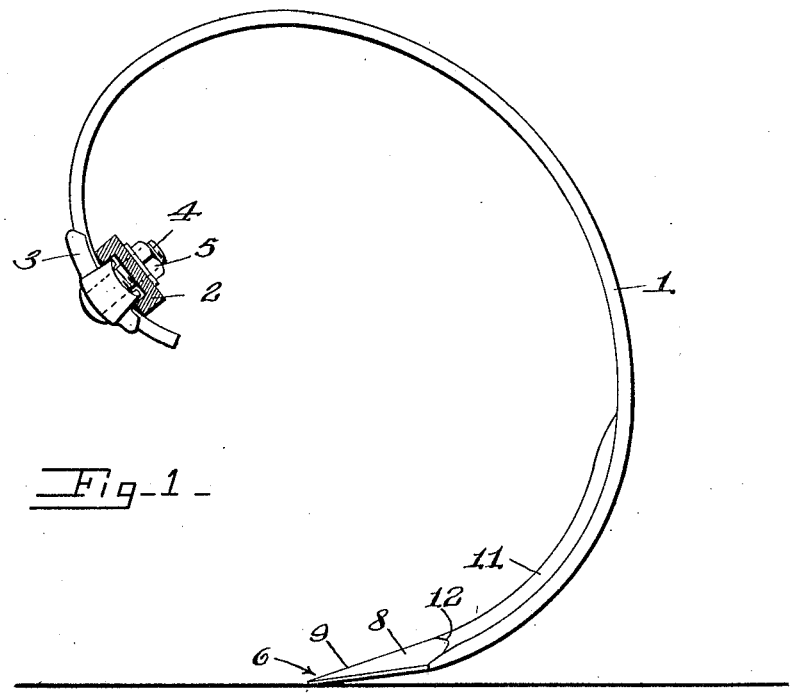
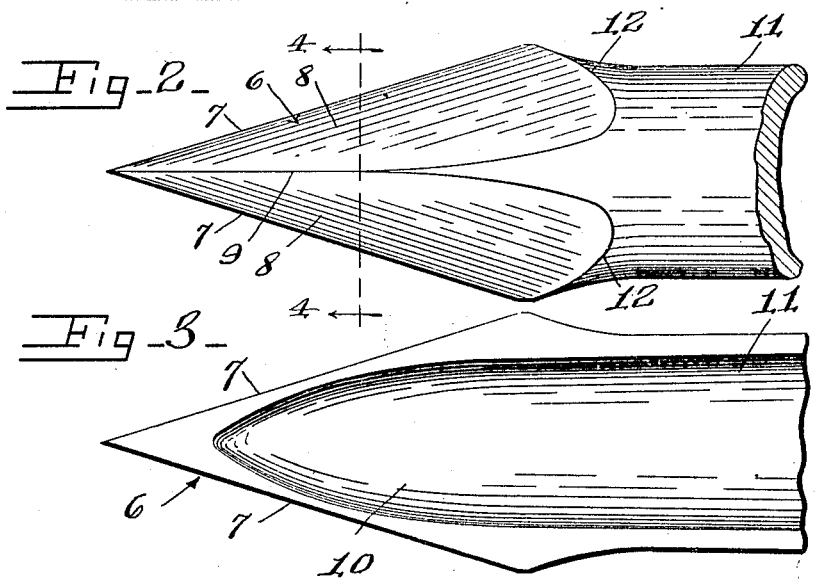
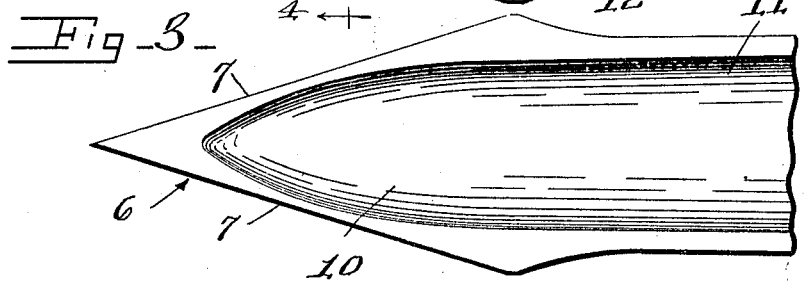
INVENTOR
William H. Lee.
BY
Parsons & Bodell.
ATTORNEYS

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

HARROW-TOOTH.

1,308,635.      Specification of Letters Patent.      Patented July 1, 1919.

Application filed September 7, 1918. Serial No. 252,987.

*To all whom it may concern:*

Be it known that I, WILLIAM H. LEE, a citizen of the United States, residing at Syracuse, in the county of Onondaga and State of New York, have invented a certain new and useful Harrow-Tooth, of which the following is a specification.

This invention has for its object a spring harrow tooth which is particularly simple in construction and highly efficient and durable in the use to which it is particularly adapted. The invention consists in the novel features hereinafter set forth and claimed.

In describing this invention, reference is had to the accompanying drawings in which like characters designate corresponding parts in all the views.

Figure 1 is a side elevation of a harrow tooth embodying my invention, the contiguous portion of the frame of the harrow being shown partly in section.

Fig. 2 is an enlarged plan view of the point and contiguous portion of the shank of the tooth.

Fig. 3 is an inverted view of parts seen in Fig. 2.

Fig. 4 is a sectional view on line 4—4, Fig. 2.

1 designates the harrow tooth as a whole which includes a spring bent into curved form as shown and connected at one end to a frame element 2 by a suitable clamping means including a clip 3, bolt 4 extending through the clip and through the frame element 2 and a nut 5 turning on the bolt. There is usually a bolt 4 passing on each side of the tooth. The spring 1 is formed from a flat metal strip.

6 is the point which is diamond shaped or formed with opposite side edges 7 converging forwardly, and with downwardly and forwardly inclined substantially flat top faces 8 inclined toward the side edges 7 and toward the apex of the point, and meeting and forming a downwardly inclined ridge 9 along the median line of the point. The bottom face of the point is formed concave as shown at 10. The point is carried at the front end of a shank 11 which is usually formed with a convex upper face and a concave lower face, the concave lower face of the point being a continuation of the lower face of the shank 11. The upper convex face of the shank meets at 12, the substantially flat top faces 8 of the point. The shank 11 is formed by bending the flat strip 1 into convex form. The point is slightly wider at its widest point than the shank at the union of the shank and the point.

This harrow tooth is particularly adapted for use in pulling roots as the roots of quack grass and the like from the soil, and in operation, when the harrow is adjusted so that its teeth enter the ground, the point of the tooth is arranged approximately as shown in Fig. 1 and while being drawn through the ground owing to the flat faces 8, and ridge 9, breaks up the soil and loosens the roots, and as the harrow moves forwardly the roots pass onto the rounded shank 11 and are pulled out of the soil.

During the movement of the point through the soil the concave lower face provides a clearance for the soil and facilitates the movement of the point through the ground.

What I claim is:

1. A harrow tooth having a point provided with a concave bottom face, forwardly converging side edges and substantially flat top faces diverging downwardly and forwardly toward the side edges and forming an inclined ridge along the median line of the point, substantially as and for the purpose specified.

2. A spring harrow tooth having a shank terminating in a point formed with forwardly converging side edges, and substantially flat top faces diverging downwardly and forwardly toward the side edges and forming an inclined ridge along the median line of the point, the shank having a convex upper face meeting the substantially flat top faces of the point, substantially as and for the purpose set forth.

3. A spring harrow tooth comprising a shank terminating in a point, the shank and point having concave bottom faces, the top face of the shank being convex, the point having forwardly converging side edges and substantially flat top faces diverging downwardly and forwardly toward the side edges, said substantially flat top faces meeting at their rear ends the convex top face of the shank, and meeting each other along the median line of the point forming a downwardly inclined ridge, substantially as and for the purpose specified.

In testimony whereof, I have hereunto signed my name, at Syracuse, in the county of Onondaga, and State of New York, this 17th day of August, 1918.

WILLIAM H. LEE.

Copies of this patent may be obtained for five cents each, by addressing the "Commissioner of Patents, Washington, D. C."